L

(12) United States Patent
Shmakova-Lindeman

(10) Patent No.: US 7,417,009 B2
(45) Date of Patent: Aug. 26, 2008

(54) PARAFFIN INHIBITORS

(75) Inventor: Olga E. Shmakova-Lindeman, Houston, TX (US)

(73) Assignee: Nalco Company, Naperville, IL (US)

( * ) Notice: Subject to any disclaimer, the term of this patent is extended or adjusted under 35 U.S.C. 154(b) by 183 days.

(21) Appl. No.: 10/810,256

(22) Filed: Mar. 26, 2004

(65) Prior Publication Data
US 2005/0215437 A1  Sep. 29, 2005

(51) Int. Cl.
C08F 220/12 (2006.01)
(52) U.S. Cl. ..................... 507/90; 526/329.5
(58) Field of Classification Search ............. 507/90; 526/329.5
See application file for complete search history.

(56) References Cited

U.S. PATENT DOCUMENTS

| 3,303,050 | A | * | 2/1967 | Roberts ............... 442/102 |
| 3,729,296 | A | * | 4/1973 | Miller ................ 44/397 |
| 3,740,367 | A | * | 6/1973 | Winkelblech .......... 524/108 |
| 3,860,552 | A | * | 1/1975 | Montillier ............. 524/853 |
| 3,970,725 | A | * | 7/1976 | Tugukuni et al. ....... 525/208 |
| 4,153,422 | A | | 5/1979 | Wisotsky |
| 4,163,646 | A | * | 8/1979 | Oude Alink et al. ..... 44/421 |
| 4,175,926 | A | | 11/1979 | Wisotsky |
| 4,520,088 | A | | 5/1985 | Senga et al. |
| 4,608,411 | A | | 8/1986 | Meunier et al. |
| 4,762,867 | A | | 8/1988 | Flodin et al. |
| 5,763,374 | A | | 6/1998 | Sakai et al. |
| 5,891,831 | A | | 4/1999 | Matsuya et al. |
| 6,090,169 | A | | 7/2000 | Krull et al. |
| 6,323,164 | B1 | * | 11/2001 | Liesen et al. ........... 508/469 |
| 6,342,553 | B1 | | 1/2002 | Hodgson et al. |
| 6,908,886 | B2 | * | 6/2005 | Jones et al. ........... 507/112 |
| 2001/0056164 | A1 | | 12/2001 | Duncum et al. |
| 2005/0085588 | A1 | * | 4/2005 | Baloche et al. ......... 524/827 |

FOREIGN PATENT DOCUMENTS

| EP | 0 345 008 A1 | | 12/1989 |
| JP | 59025888 A | | 2/1984 |
| JP | 59-122509 | * | 7/1984 |
| JP | 04046353 A2 | | 2/1992 |
| JP | 04046354 A2 | | 2/1992 |
| JP | 04095971 A2 | | 3/1992 |
| JP | 04288558 A2 | | 10/1992 |
| JP | 05150560 A2 | | 6/1993 |
| JP | 06027747 A2 | | 2/1994 |
| JP | 06051569 A2 | | 2/1994 |
| JP | 08155586 A2 | | 6/1996 |
| JP | 10204354 A2 | | 8/1998 |
| JP | 2001131455 A2 | | 5/2001 |
| WO | WO 00/78891 A1 | | 12/2000 |
| WO | WO 03/014170 A1 | * | 2/2003 |

OTHER PUBLICATIONS

Abstract, English language translation of JP 59-122509, Jul. 16, 1984.*
Preparation of Octadecyl Acrylate/Maleic Anhydride/Styrene Copolymer AAMAS as Pour Point Depressant; Song Z.-Z; Zhang G.-C; Ge J.-J.; Petroleum Eng. Dept., Petroleum University; Oilfield Chemistry 17/2, 122-125, Jun. 2000.

* cited by examiner

Primary Examiner—Margaret G Moore
(74) Attorney, Agent, or Firm—Michael B. Martin

(57) ABSTRACT

A paraffin inhibitor comprising a polymer composed of about (a) 1 to about 98 weight percent of one or more $C_1$-$C_{30}$ alkyl esters of acrylic acid; (b) about 1 to about 98 weight percent of one or more $C_1$-$C_{30}$ alkyl esters of methacrylic acid; (c) and about 1 to about 30 weight percent of one or more unsaturated monomers selected from the group consisting of (meth)acrylamide monomers, vinyl aromatic monomers, vinyl cycloalkyl monomers, vinyl heterocyclyl monomers, vinyl esters of aliphatic acids, vinyl esters of aromatic acids, vinyl esters of heterocyclic acids, maleimide and maleic anhydride wherein the alkyl ester portion of one of (a) or (b) is $C_{10}$-$C_{30}$ alkyl, compositions comprising the polymer and methods of using the polymer to inhibit the deposition of paraffin from oil.

27 Claims, No Drawings

PARAFFIN INHIBITORS

TECHNICAL FIELD

This invention relates to a polymers and polymer compositions and use thereof as an additive for inhibiting the deposition of paraffin and improving the flow properties of crude oils, condensates fuel oil, diesel oil and middle distillates, particularly in low temperature or offshore applications.

BACKGROUND OF THE INVENTION

Crude oils and middle distillates obtained by distillation of crude oils such as gas oil, diesel oil or heating oil contain varying amounts of paraffin, which can form precipitates. In the case of crude oil, the paraffin in usually liquefied and stabilized in the crude oil under high temperatures encountered at the downhole. However, as the oil is brought to the surface its temperature is reduced. As a result, the paraffin may begin to precipitate out and may form deposits on any cooler surface with which they come into contact. These wax deposits can cause problems, such as blockage of pipelines, valves and other process equipment. The wax may also deposit in pipelines subsequently used to transport crude oil or fractions thereof including hydrocarbon lines or multiphase transportation lines with oil, gas and/or water.

The contents of the transport pipelines are often cooler than the contents of lines on oil platforms or in refineries. This cooling is especially critical in respect of lines from offshore oil fields to the land and landlines in winter or in cold territories.

With respect to crude oil distillates such as diesel fuel or heating oil, precipitation of paraffin results in the impairment of the flow properties of the fuel, which can result in problems during their recovery, transport, storage and/or use. In winter, for example, it may in certain instances be necessary to store the fuels in heated tanks. Precipitation of paraffin can also result in blockage of the filters in diesel engines and furnaces, preventing reliable metering of the fuels and in some cases causing complete interruption of the supply of fuel.

Wax deposition may be reduced in a number of ways, including keeping the lines hot, diluting the oil with solvent, or using additives, which interfere with wax crystal growth.

Typical additives include wax crystal modifiers, pour point dispersants, paraffin deposition inhibitors, and the like. Most additives are polymeric in nature. However, due to the polymeric nature and associated molecular weights, these typically have problems with handling, especially in low temperature applications. Therefore, the additives are generally diluted to about 5% active concentration or below for capillary or umbilical (deep water) delivery of chemicals. Yet, this results in the use of tremendous volume of products, especially solvents, resulting in increased costs for shipping, storage, and ultimately production of the oil. Also, the excessive amount of organic solvents, predominantly aromatics, can cause significant environmental problems.

SUMMARY OF THE INVENTION

This invention is a paraffin inhibitor comprising a polymer composed of
(a) about 1 to about 98 weight percent of one or more $C_1$-$C_{30}$ alkyl esters of acrylic acid;
(b) about 1 to about 98 weight percent of one or more $C_1$-$C_{30}$ alkyl esters of methacrylic acid; and
(c) about 1 to about 30 weight percent of one or more unsaturated monomers selected from the group consisting of (meth)acrylamide monomers, vinyl aromatic monomers, vinyl cycloalkyl monomers, vinyl heterocyclyl monomers, vinyl esters of aliphatic acids, vinyl esters of aromatic acids, vinyl esters of heterocyclic acids, maleimide and maleic anhydride, wherein the alkyl ester portion of at least one of (a) or (b) is $C_{10}$-$C_{30}$ alkyl.

The polymer of this invention inhibits the deposition of paraffin from different oils and improve their flow properties. Unlike copolymer paraffin inhibitor compositions, compositions comprising the polymer remain liquid at temperatures as low as 0° C. at concentrations of up to 50 percent polymer actives, making the compositions particularly useful for umbilical (deep water) and low temperature applications.

DETAILED DESCRIPTION OF THE INVENTION

Definitions of Terms

"Alkoxy" means an alkyl-O- group where alkyl is defined herein. Representative alkoxy groups include methoxy, ethoxy, propoxy, butoxy, and the like.

"Alkyl" means a monovalent group derived from a straight, branched chain or cyclic saturated hydrocarbon by the removal of a single hydrogen atom. Representative alkyl groups include methyl, ethyl, n- and iso-propyl, hexyl, octyl, lauryl, eicosanyl, cetyl, stearyl, cyclohexyl, and the like.

"Alkyl ester of acrylic acid" means a monomer of formula $H_2C=CHCO_2R$ where R is $C_1$-$C_{30}$ alkyl or $C_5$-$C_{15}$ cycloalkyl where cycloalkyl is defined herein. Representative alkyl esters of acrylic acid include hexyl acrylate, octyl acrylate, decyl acrylate, stearyl acrylate, eicosanyl acrylate, lauryl acrylate, behenyl acrylate, and the like.

"Alkyl ester of methacrylic acid" means a monomer of formula $H_2C=C(CH_3)CO_2R'$ where R' is $C_1$-$C_{30}$ alkyl or $C_5$-$C_{15}$ cycloalkyl where cycloalkyl is defined herein. Representative alkyl esters of methacrylic acid include hexyl methacrylate, octyl methacrylate, decyl methacrylate, stearyl methacrylate, eicosanyl methacrylate, lauryl methacrylate, behenyl methacrylate, and the like.

"(Meth)acrylamide monomer" means a monomer of formula $H_2C=C(R_3)CONR_1R_2$ wherein $R_3$ is H or $CH_3$; and $R_1$ and $R_2$ are independently selected from H and $C_1$-$C_4$ alkyl, optionlly substituted with —$SO_3H$. Representative acrylamide monomers include acrylamide, methacrylamide, N,N-dimethylacrylamide, N,N-diethylacrylamide, N-isopropylacrylamide, N-t-butylacrylamide, 2-acrylamido-2-methyl-1-propanesulfonic and the like. Acrylamide and methacrylamide are preferred.

"Vinyl aromatic monomer" means a monomer of formula Aryl-C($R_5$)=CHR6 wherein $R_5$ is H or $C_1$-$C_4$ alkyl; $R_6$ is H, $C_1$-$C_4$ alkyl or —$CO_2R_7$ where $R_7$ is $C_1$-$C_4$ alkyl and Aryl is an aromatic monocyclic or multicyclic carbocyclic or heterocyclic ring system of about 5 to about 15 ring atoms, optionally substituted with one or more $C_1$-$C_{30}$ alkyl or $C_1$-$C_{30}$ alkoxy groups. Representative vinyl aromatic monomers include styrene, α-methyl styrene, b-methyl styrene, 3- or 4-methylstyrene, 2-vinylnaphthalene, 9-vinylcarbazole, 1-vinylimidazole, 2- and 4-vinylpyridine, cinnamic acid esters such as methyl cinnamate, and the like. Preferred vinyl aromatic monomers include styrene and cinnamic acid esters.

"Vinyl cycloalkyl monomer" means a monomer of formula Cycloalkyl-CH=$CH_2$ wherein Cycloalkyl is a non-aromatic monocyclic or heterocyclic ring system of about 5 to about 15 ring atoms, optionally substituted with one or more $C_1$-$C_{30}$ alkyl or $C_1$-$C_{30}$ alkoxy groups. The cycloalkyl ring may also contain one or more carbon-carbon double bonds. Representative vinyl cycloalkyl monomers include vinylcyclopentane, vinylcyclohexane, 4-vinyl-1-cyclohexene, 2-vinyl-1,3-dioxolane, 5-vinyl-2-norbornene, and the like. Vinylcyclohexane is preferred.

"Vinyl esters of aliphatic acids" means a monomer of formula $R_4CO_2CH=CH_2$ wherein $R_4$ is H or $C_1$-$C_6$ alkyl. Representative vinyl esters of aliphatic acids include vinyl acetate, vinyl propionate, and the like. Vinyl acetate is preferred.

"Vinyl esters of aromatic acids" means a monomer of formula Aryl-$CO_2CH=CH_2$ wherein Aryl is as defined herein. Representative vinyl esters of aromatic acids include vinyl benzoate, vinyl-4-tert-butyl benzoate, and the like.

"Vinyl esters of heterocyclic acids" means a monomer of formula Het-$CO_2CH=CH_2$ where Het is non-aromatic heterocyclic ring system of about 5 to about 10 ring atoms, optionally substituted with one or more $C_1$-$C_{20}$ alkyl or $C_1$-$C_{20}$ alkoxy groups.

Preferred Embodiments

The polymer of this invention is prepared by polymerizing about 1 to about 98 weight percent of one or more $C_1$-$C_{30}$ alkyl esters of acrylic acid, about 1 to about 98 weight percent of one or more $C_1$-$C_{30}$ alkyl esters of methacrylic acid and about 1 to about 30 weight percent, based on total monomer, of one or more olefinic monomers under free radical forming conditions. The polymerization is preferably conducted by heating a mixture of the monomers and free radical initiator(s) in a suitable organic solvent at a temperature of about 50 to about 150° C. for about 1 to about 5 hours under inert atmosphere. Suitable solvents include toluene, xylene, heavy aromatic naphtha, mineral oil, iso-paraffinic solvent (isopar), Arivasol, kerosene, methylene chloride, acetonitrile, methyl sulfoxide, and the like. Monomers, which are solids at ambient temperature, are melted prior to addition to mixing with the solvent.

The polymerization reaction is initiated by any means, which results in generation of a suitable free radical. Thermally derived radicals, in which the radical species results from thermal, homolytic dissociation of an azo, peroxide, hydroperoxide and perester compound are preferred. Representative initiator compounds include azo compounds such as 2,2'-azobis(2-amidinopropane) dihydrochloride, 2,2'-azobis[2-(2-imidazolin-2-yl)propane]dihydrochloride, 2,2'-azobis(isobutyronitrile) (AIBN), 2,2'-azobis(2,4-dimethylvaleronitrile) (AIVN), 2,2'-azobis(2-methyl, ethyl-propionitrile), and the like, tert-butyl peroxibenzoate, benzoyl peroxide, N-oxyl compounds such as 2,2,6,6-tetramethyl-1-piperidinyloxy-free radical (TEMPO), N-methyl-N-nitroso-p-toluenosulfonamide (Diazald), and the like.

The polymer preferably has a number average molecular weight about 1,000 to about 150,000 Daltons, more preferably about 10,000 to about 100,000 Daltons with a polydispersity of 1.5-11. The viscosity of the polymer is from about 10 cP to about 1500 cP at 20° C. as 40% solution in toluene.

Olefinic monomers suitable for preparing the polymer of this invention are selected from (meth)acrylamide monomers, vinyl aromatic monomers, vinyl cycloalkyl monomers, vinyl heterocyclyl monomers, vinyl esters of aliphatic acids, vinyl esters of aromatic acids, vinyl esters of heterocyclic acids, maleimide and maleic anhydride.

In a preferred aspect of this invention, the polymer has a number average molecular weight of about 1,000 to about 150,000 Daltons.

In another preferred aspect, the unsaturated monomer is selected from the group consisting of styrene, vinyl acetate, maleic anhydride, vinyl cyclohexane, vinyl propionate and cinnamic acid $C_1$-$C_4$ alkyl esters.

In another preferred aspect, the polymer comprises about 65 to about 85 weight percent of the $C_1$-$C_{30}$ alkyl ester of acrylic acid;

In another preferred aspect, the polymer comprises about 65 to about 85 weight percent of a $C_{16}$-$C_{24}$ alkyl ester of acrylic acid.

In another preferred aspect, the polymer comprises about 5 to about 15 weight percent of the $C_1$-$C_{30}$ alkyl ester of methacrylic acid.

In another preferred aspect, the polymer comprises about 5 to about 15 weight percent of a $C_{10}$-$C_{30}$ alkyl ester of acrylic acid.

In another preferred aspect, the polymer comprises about 5 to about 15 weight percent of the unsaturated monomer.

In another preferred aspect, the unsaturated monomer is styrene, vinyl acetate or maleic anhydride.

In another preferred aspect, the polymer has a number average molecular weight of about 10,000 to about 100,000 Daltons.

In another preferred aspect, the alkyl ester of acrylic acid is behenyl acrylate, the alkyl ester of methacrylic acid is lauryl methacrylate and the unsaturated monomer is styrene or vinyl acetate.

In another preferred aspect, the polymer comprises about 5 to about 20 weight percent of the $C_1$-$C_{30}$ alkyl ester of acrylic acid.

In another preferred aspect, the polymer comprises about 5 to about 20 weight percent of a $C_{16}$-$C_{24}$ alkyl ester of acrylic acid.

In another preferred aspect, the polymer comprises about 70 to about 85 weight percent of the $C_{10}$-$C_{30}$ alkyl ester of methacrylic acid.

In another preferred aspect, the polymer comprises about 70 to about 85 weight percent of a $C_{10}$-$C_{16}$ alkyl ester of acrylic acid.

In another preferred aspect, the alkyl ester of acrylic acid is lauryl acrylate, the alkyl ester of methacrylic acid is behenyl methacrylate and the unsaturated monomer is vinyl acetate.

In another aspect, this invention is a method of inhibiting the deposition of paraffins and improving the flow properties of oil comprising adding to the oil an effective amount of the polymer of this invention. Effective polymer doses are typically about 1 to about 5,000 ppm, preferably about 10 to about 300 ppm, based on polymer actives.

In another preferred aspect, this invention is a method of inhibiting the deposition of paraffins and improving the flow properties of oil comprising adding to the oil an effective amount of a polymer composition comprising an effective amount of the polymer of this invention and one or more solvents. Suitable solvents include toluene, xylene, high aromatic naphtha, mineral oil, iso-paraffinic solvent (isopar), Arivasol, kerosene, methylene chloride, acetonitrile, methyl sulfoxide, and the like. The paraffin inhibitor composition preferably comprises about 1 to about 50 weight percent, more preferably about 5 to about 30 weight percent of polymer, based on polymer actives.

The polymer composition is diluted with solvent to the requisite level or blended with water to form a dispersion. The composition can be added to the pipeline by batch or continuous injection or squeezing, upstream or downstream of the location of any potential cold area likely to result in deposition of wax, gellation, thickening, sludging, etc. Also, the polymer composition can be added at the cold area (reservoir, tank, container, etc.) to decrease the pour point of crude oil, condensate, middle distillate, etc.

However, in some instances, the composition may be either too viscous or solid at the required paraffin-inhibiting concentration, especially at the low temperature (−30° C. to about 10° C.), conditions that may be experienced by the oil during its travel through the pipeline e.g. from an offshore platform. In such cases, the composition may be further diluted with a suitable solvent as described above as necessary.

In a preferred aspect of this invention, the paraffin inhibitor composition is liquid at a temperature of 0° C.

In another preferred aspect, the paraffin inhibitor composition comprises about 1 to about 50 weight percent of the polymer of claim 1, based on polymer actives.

In another preferred aspect, the paraffin inhibitor composition comprises about 5 to about 30 weight percent of the polymer of claim 1, based on polymer actives.

In another preferred aspect, the oil is crude oil, condensate or middle distillate.

In another preferred aspect, the oil is crude oil.

In another preferred aspect, the oil is fuel oil or diesel.

The polymer composition may be used alone or in combination with other additives including dewaxing auxiliaries, corrosion inhibitors, asphaltene inhibitors, scale inhibitors, antioxidants, lubricity additives, dehazers, conductivity improvers, cetane number improvers, sludge inhibitors, and the like.

The foregoing may be better understood by the following Examples, which are presented for purposes of illustration and are not intended to limit the scope of this invention.

EXAMPLES

Example 1

Preparation of a Stearyl Acrylate/hexyl Methacrylate/styrene Polymer

Toluene (15 g), stearyl acrylate (15 g), hexyl methacrylate (3 g), and styrene (3 g) are charged to a reactor equipped with a stirrer, a heater, a thermometer, and a nitrogen-bubbling duct. The reactor is flushed with nitrogen gas and sealed. The reactor is heated to 60° C. and 2,2'-azobis(2-methyl, ethyl-propionitrile) (0.06 g) is added. The reaction mixture is heated in the closed system at 85° C. for three-four hours, to provide stearyl acrylate/hexyl methacrylate/styrene polymer having a number average molecular weight 34,600 Daltons with polydispersity 2.1. The viscosity of the polymer is 40 cP at 20° C. as a 40% solution in toluene.

Example 2

Preparation of a Behenyl Acrylate/lauryl Methacrylate/styrene Polymer

Toluene (15 g), behenyl acrylate (15 g), lauryl methacrylate (2 g), and styrene (2 g) are charged to a reactor equipped with a stirrer, a heater, a thermometer, and a nitrogen-bubbling duct. The reactor is flushed with nitrogen gas and sealed. The reactor is heated to 60° C. and 2,2'-azobis(2-methyl, ethyl-propionitrile) (0.06 g) is added. The reaction mixture is heated in the closed system at 85° C. for three hours to provide behenyl acrylate/lauryl methacrylate/styrene polymer having a number average molecular weight 34,600 Daltons with polydispersity 2.1. The viscosity of the polymer is 40 cP at 20° C. as a 40% solution in toluene.

Example 3

Preparation of a Behenyl Acrylate/octyl Methacrylate/vinyl Benzoate Polymer

Xylene (15 g), behenyl acrylate (15 g) octyl methacrylate (3 g) and vinyl benzoate (3 g) are charged to a reactor equipped with a stirrer, a heater, a thermometer and a nitrogen-bubbling duct. The reactor is flushed with nitrogen gas and sealed. The reactor is heated to 60° C. and 2,2'-azobis(2-methyl, ethyl-propionitrile) (0.06 g) is added. The reaction mixture is heated in the closed system at 80° C. for two-four hour periods to provide behenyl acrylate/octyl methacrylate/vinyl benzoate polymer having a number average molecular weight of 47,750 Daltons with polydispersity 4.5. The viscosity of the polymer is 168 cP at 20° C. as a 40% solution in toluene.

Example 4

Preparation of a Stearyl Methacrylate/octyl Acrylate/vinyl Acetate Polymer

Xylene (15 g), stearyl methacrylate (15 g), octyl acrylate (5 g) and vinyl acetate (5 g) are charged to a reactor equipped with a stirrer, a heater, a thermometer, and a nitrogen-bubbling duct. The reactor is flushed with nitrogen gas and sealed. The reactor is heated to 60° C. and 2,2'-azobis(2-methyl, ethyl-propionitrile) (0.06 g) is added. The reaction mixture is heated in the closed system at 75° C. for four hours to provide behenyl methacrylate/lauryl acrylate/vinyl acetate polymer having a number average molecular weight of 41,008 Daltons with polydispersity 3.4. The viscosity of the polymer is 135 cP at 20° C. as a 40% solution in toluene.

Example 5

Preparation of a Behenyl Methacrylate/lauryl Acrylate/vinyl Acetate Polymer

Xylene (15 g), behenyl methacrylate (15 g), lauryl acrylate (2 g), are charged to a reactor equipped with a stirrer, a heater, a thermometer, and a nitrogen-bubbling duct. The reactor is flushed with nitrogen gas and sealed. Then vinyl acetate (2 g) is charged. The reactor is heated to 60° C. and 2,2'-azobis(2-methyl, ethyl-propionitrile) (0.06 g) is added. The reaction mixture is heated in the closed system at 75° C. for one hour, at 90° C. for 30 minutes, and at 110° C. for one hour to provide behenyl methacrylate/lauryl acrylate/vinyl acetate polymer having a number average molecular weight of 41,008 Daltons with polydispersity 3.4. The viscosity of the polymer is 135 cP at 20° C. as a 40% solution in toluene.

Example 6

Preparation of a Behenyl Acrylate/lauryl Methacrylate/vinyl Acetate Polymer

Xylene (15 g), behenyl acrylate (15 g) and lauryl methacrylate (2 g), are charged to a reactor equipped with a stirrer, a heater, a thermometer and a nitrogen-bubbling duct. The reactor is flushed with nitrogen gas and sealed. Then vinyl acetate (2 g) is charged. The reactor is heated to 60° C. and 2,2'-azobis(2-methyl, ethyl-propionitrile) (0.06 g) is added. The reaction mixture is heated in the closed system at 80° C. for two hours to provide behenyl acrylate/lauryl methacrylate/vinyl acetate polymer having a number average molecular weight of 47,750 Daltons with polydispersity 4.5. The viscosity of the polymer is 168 cP at 20° C. as a 40% solution in toluene.

Example 7

Preparation of a Behenyl Acrylate/lauryl Methacrylate/Maleic Anhydride Polymer

Isopar (10 g), behenyl acrylate (15 g), and lauryl methacrylate (2 g) are charged to a reactor equipped with a stirrer, a heater, a thermometer, an additional funnel containing a solution of maleic anhydride (2 g) in toluene (5 g), and a nitrogen-bubbling duct. The reactor is flushed with nitrogen gas and sealed. The reactor is heated to 85° C. and tert-butyl peroxibenzoate (0.2 g) is added. The reaction mixture is heated in the closed system at 85° C. for three hours, and tert-butyl peroxibenzoate (0.2 g) is charged two more times. Then the reaction is heated at 100° C. for one hour, at 110° C. for 30 minutes and at 125° C. for one hour to provide behenyl acrylate/lauryl methacrylate/maleic anhydride polymer having a number average molecular weight of 20,659 Daltons with polydispersity 1.8. The viscosity of the polymer is 110 cP at 20° C. as a 40% solution in toluene.

vinyl acetate and Manh stands for maleic anhydride. Polymer samples are prepared as a 40 weight percent solution in toluene.

Viscosity as a function of temperature as measured by Brookfield DV111+Rheometer for each sample using a small sample adapter. The shear rate is constant (2 Hz). Spindle# 21 is applied. Temperature changes from 30° C. to 0° C. with gradient 1°/min.

Number average molecular weight and polydispersity (as $M_w/M_n$) are determined using gel permeation chromatography system (GPC) data. The system consists of a LDC/Milton Roy ConstaMetric III metering pump with a constant 1 ml/min flow rate, a three column bank using Water'HR4, HR3 and 500 Å columns and a Hewlett Packard 1037A Reflective Index Detector. The standard is polyester set with the following molecular weights: 900K, 400K, 200K, 90K, 50K, 25K, 13K, 8K, 4K, 1681, 800, 391, and 278. The data is collected and analyzed using a Waters Millennium chromatography data collection system.

TABLE 1

Characterization of Polymeric Paraffin Inhibitors

| | Polymer Components | $M_n$/PDI | Viscosity, cP @ Temperature, °C. | | | | | |
|---|---|---|---|---|---|---|---|---|
| | | | 25 | 20 | 15 | 10 | 5 | 0 |
| 1 | BAcr | 23629 | 100 | 130 | 130 | Solid | Solid | Solid |
| 2 | BMAcr | 55890 | 380 | 400 | 440 | 490 | 640 | Solid |
| 3 | BAcr:Str | 41323 | 85 | 90 | 100 | 115 | 190 | 900 |
| 4 | BAcr:LMAcr | 21270 | 90 | 110 | 120 | Solid | Solid | Solid |
| 5 | BAcr:LMAcr:Str | 34566 | 40 | 40 | 45 | 55 | 65-70 | 90-200 |
| 6 | BAcr:LMAcr:Str | 39213 | 35 | 37 | 43 | 55 | 65-70 | 85-180 |
| 7 | BAcr:LMAcr:VA | 47748 | 180 | 195 | 220 | 240 | 400 | Solid |
| 8 | BMAcr:LAcr:Str | 50000 | 250 | 280 | 320 | 370 | 400 | 500 |
| 9 | BMAcr:LAcr:VA | 41008 | 120 | 135 | 150 | 160 | 180 | 210 |
| 10 | BAcr:LMAcr:MAnh | 20659 | 100 | 110 | 130 | 180 | Solid | Solid |

Example 8

Preparation of an Eicosanyl Acrylate/lauryl Methacrylate/maleic Anhydride Polymer Isopar (10 g), eicosanyl acrylate (15 g), and lauryl methacrylate (3 g) are charged to a reactor equipped with a stirrer, a heater, a thermometer, an addition funnel containing a solution of maleic anhydride (3 g) in toluene (5 g), and a nitrogen-bubbling duct. The reactor is flushed with nitrogen gas and sealed. The reactor is heated to 85° C. and tert-butyl peroxibenzoate (0.2 g) is added. The reaction mixture is heated in the closed system at 85° C. for three hours, and tert-butyl peroxibenzoate (0.2 g) is charged two more times. Then the reaction is heated at 100° C. for one hour and at 125° C. for one hour to provide eicosanyl acrylate/lauryl methacrylate/maleic anhydride polymer having a number average molecular weight of 20,659 Daltons with polydispersity 1.8. The viscosity of the polymer is 110 cP at 20° C. as a 40% solution in toluene.

Representative polymeric paraffin inhibitors are characterized in Table 1. Polymers 5-10 are representative polymers of this invention prepared according to the method of Examples 1-8. Polymers 1-4 are presented for comparison. In Table 1, Bacr stands for behenyl acrylate, BMAcr stands for behenyl methacrylate, Lacr stands for lauryl acrylate, LMAcr stands for lauryl methacrylate, Str stands for styrene, VA stands for

Example 9

Rheological Performance of Representative Paraffin Inhibitor Compositions

For Table 2, Viscosity as a function of temperature as measured by Brookfield DV 111+Rheometer for each sample using a small sample adapter. The shear rate is constant (50 Hz). Spindle# 21 is applied. Temperature is changed with a gradient of 1° C./min. from 40° C. to 0° C. with gradient 1°/min.

For Table 3, viscosity as a function of temperature as measured by TA Instrument AR1000 Rheomter for each sample using a small sample adapter (bob and cup). The shear rate is constant (50Hz). Temperature changed from 60° C. to 0° C. for two hours period.

In Tables 2 and 3, the polymer dose is 1,000 ppm based on polymer actives. Polymers are dosed as a 40 weight percent solution in toluene.

As shown in Tables 2 and 3, the polymer paraffin inhibitors of this invention significantly improve the Theological properties of crude oil and shift the WAT of the fluid to the low temperature region. Crude oil stays liquid and pumpable at temperatures of 5-15° C. below the pour point of the blank with the addition of representative inhibitors.

TABLE 2

Rheological Performance of Paraffin Inhibitors (500 ppm) on Crude Oil #1 (wax appearance temperature "WAT" = 30° C., pour point temperature "PPT" = 23° C.)

| | Viscosity[1] (cP) @ Temperature(° C.) | | | |
|---|---|---|---|---|
| Example | 25 | 15 | 10 | 5 |
| Blank | 18.25 | Solid | Solid | Solid |
| Polymer 1 | 5.40 | 10.50 | 52.58 | Solid |
| Polymer 2 | 12.00 | 15.11 | 49.62 | Solid |
| Polymer 3 | 7.97 | 92.35 | Solid | Solid |
| Polymer 4 | 6.09 | 76.76 | Solid | Solid |
| Polymer 5 | 8.96 | 76.42 | Solid | Solid |
| Polymer 6 | 12.86 | 90.32 | Solid | Solid |
| Polymer 7 | 4.4 | 9.06 | 11.34 | 32.2 |
| Polymer 8 | 22.5 | 102.01 | Solid | Solid |
| Polymer 9 | 11.53 | 32.65 | 38.95 | 77.60 |
| Polymer 10 | 11.34 | 68.68 | Solid | Solid |

TABLE 3

Rheological Performance of Paraffin Inhibitors (500 ppm) on Crude Oils 2 and 3

| | Crude Oil #2[1] (WAT = 25° C., PP = −10° C.) Viscosity(Pa·s) @Temperature(° C.) | | | Crude Oil #3[1] (WAT = 20° C., PP = 5° C.) Viscosity(Pa·s) @Temperature(° C.) | | |
|---|---|---|---|---|---|---|
| Example | 20 | 10 | 5 | 20 | 10 | 5 |
| Blank | 15.6 | 19.9 | 45.8 | 3.73 | 19.80 | Solid |
| Polymer 1 | 9.6 | 15.3 | 40.7 | | | |
| Polymer 2 | | | | 3.85 | 5.74 | 9.0 |
| Polymer 5 | 8.4 | 12.3 | 39.0 | | | |
| Polymer 7 | 7.6 | 14.8 | 31.4 | 3.90 | 5.40 | 7.66 |
| Polymer 9 | | | | 3.71 | 5.50 | 8.00 |

Example 10

Inhibition of Paraffin Deposition

The Low Shear Wax Deposition (cold finger) procedure is used to screen paraffin inhibitors for waxy crude oils. The Cold Finger test unit consists of two main parts. A water bath chamber that keeps the oil at prescribed temperature (usually above the oil's wax appearance temperature (WAT)) and a metal tube (cold finger) in which cold fluid circulate maintaining the finger temperature below that of the surrounding oil.

A heat flux across the finger's metal surface and the bulk oil sample induces the wax deposition. The wax deposit that is formed for untreated oil is compared the deposit that is formed for treated oil. A percent inhibition number is calculated from the ratio of the two values.

Representative polymer paraffin inhibitors of this invention are tested using the following procedure. The polymer dose is 1,000 ppm based on polymer actives. Polymers are dosed as a 40 weight percent solution in toluene.
1. Set the appropriate test conditions.
2. Place a beneficiated oil sample in the hot water chamber.
3. Set the cold finger into the heated oil.
4. Start the test.
5. Run the test for the appropriate amount of time.
6. At the end of the test remove the cold finger from the test chamber and wash the finger with cold 2-butanone.
7. After washing allow the deposit to dry.
8. Soak the cold finger in toluene until the wax deposit is completely removed.
9. Using a rotary evaporator, evaporate off the toluene and weight the wax deposit.
10. Calculate the percent inhibition value.

As shown in Table 4, the polymer composition of this invention provide enhanced protection against the deposition of paraffin from crude oil.

TABLE 4

Deposition Prevention Performance of Paraffin Inhibitors on Crude Oil #2

| Polymer | Deposition Protection, % |
|---|---|
| Blank | 0 |
| Polymer 1 | 18 |
| Polymer 2 | 25 |
| Polymer 5 | 26 |
| Polymer 7 | 64 |
| Polymer 9 | 72 |

Changes can be made in the composition, operation and arrangement of the method of the invention described herein without departing from the concept and scope of the invention as defined in the claims.

The invention claimed is:

1. A paraffin inhibitor comprising a polymer consisting of
   (a) about 1 to about 98 weight percent of one or more $C_1$-$C_{30}$ alkyl esters of acrylic acid;
   (b) about 1 to about 98 weight percent of one or more $C_6$-$C_{30}$ alkyl esters of methacrylic acid; and
   (c) about 1 to about 30 weight percent of one or more unsaturated monomers selected from the group consisting of styrene, vinyl acetate, maleic anhydride, vinyl cyclohexane, vinyl propionate and cinnamic acid $C_1$-$C_4$ alkyl esters and wherein the alkyl ester portion of at least one of (a) or (b) is $C_{10}$-$C_{30}$ alkyl.

2. The paraffin inhibitor of claim 1 wherein the polymer has a number average molecular weight of about 1,000 to about 150,000 Daltons.

3. The paraffin inhibitor of claim 2 comprising about 5 to about 15 weight percent of a $C_{10}$-$C_{30}$ alkyl ester of acrylic acid.

4. The paraffin inhibitor of claim 3 comprising about 5 to about 15 weight percent of the unsaturated monomer.

5. The paraffin inhibitor of claim 4 wherein the unsaturated monomer is styrene, vinyl acetate or maleic anhydride.

6. The paraffin inhibitor of claim 4 having a number average molecular weight of about 10,000 to about 100,000 Daltons.

7. The paraffin inhibitor of claim 2 wherein the alkyl ester of acrylic acid is behenyl acrylate, the alkyl ester of methacrylic acid is lauryl methacrylate and the unsaturated monomer is styrene or vinyl acetate.

8. The paraffin inhibitor of claim 2 comprising about 5 to about 20 weight percent of the $C_1$-$C_{30}$ alkyl ester of acrylic acid.

9. The paraffin inhibitor of claim 2 comprising about 5 to about 20 weight percent of a $C_{16}$-$C_{24}$ alkyl ester of acrylic acid.

10. The paraffin inhibitor of claim 2 comprising about 70 to about 85 weight percent of the $C_6$-$C_{30}$ alkyl ester of methacrylic acid.

11. The paraffin inhibitor of claim 2 comprising about 70 to about 85 weight percent of a $C_{10}$-$C_{16}$ alkyl ester of acrylic acid.

12. The paraffin inhibitor of claim 2 wherein the alkyl ester of acrylic acid is lauryl acrylate, the alkyl ester of methacrylic acid is behenyl methacrylate and the unsaturated monomer is vinyl acetate.

13. A paraffin inhibitor composition comprising the polymer of claim 1 and one or more organic solvents.

14. The paraffin inhibitor composition of claim 13 comprising about 1 to about 50 weight percent of the polymer of claim 1, based on polymer actives.

15. The paraffin inhibitor composition of claim 13 comprising about 5 to about 30 weight percent of the polymer of claim 1, based on polymer actives.

16. The paraffin inhibitor composition of claim 13 that is liquid at a temperature of 0° C.

17. A paraffin inhibitor composition comprising the polymer of claim 1 dispersed in water.

18. A method of inhibiting the deposition of paraffin and improving the flow properties of oil comprising adding to the oil an effective amount of the polymer of claim 1.

19. A method of inhibiting the deposition of paraffin and improving the flow properties of oil comprising adding to the oil an effective amount of the composition of claim 13.

20. The method of claim 19 wherein the oil is crude oil, condensate or middle distillate.

21. The method of claim 20 wherein the oil is crude oil.

22. The method of claim 19 wherein the oil is fuel oil or diesel.

23. A method of inhibiting the deposition of paraffin and improving the flow properties of oil comprising adding to the oil about 1 to about 5,000 ppm, based on polymer actives of the polymer of claim 1.

24. The method of claim 23 wherein about 10 to about 300 ppm, based on polymer actives of the polymer of claim 1 is added to the oil.

25. A paraffin inhibitor comprising a polymer consisting of
(a) about 65 to about 85 weight percent of one or more $C_1$-$C_{30}$ alkyl esters of acrylic acid;
(b) about 5 to about 15 weight percent of one or more $C_1C_{30}$ alkyl esters of methacrylic acid; and
(c) about 1 to about 30 weight percent of one or more unsaturated monomers selected from the group consisting of styrene, vinyl acetate, maleic anhydride, vinyl cyclohexane, vinyl propionate and cinnamic acid $C_1$-$C_4$ alkyl esters, wherein the alkyl ester portion of at least one of (a) or (b) is $C_{10}$-$C_{30}$ alkyl and wherein the polymer has a number average molecular weight of about 1,000 to about 150,000 Daltons.

26. The paraffin inhibitor of claim 25 comprising about 65 to about 85 weight percent of a $C_{16}$-$C_{24}$ alkyl ester of acrylic acid.

27. A method of inhibiting the deposition of paraffin and improving the flow properties of oil comprising adding to the oil an effective amount of the polymer of claim 25.

* * * * *